*T. Kenderdine, Jr.,*
*Scroll Sawing Machine,*
Nº 1,719, Patented Aug. 12, 1840.
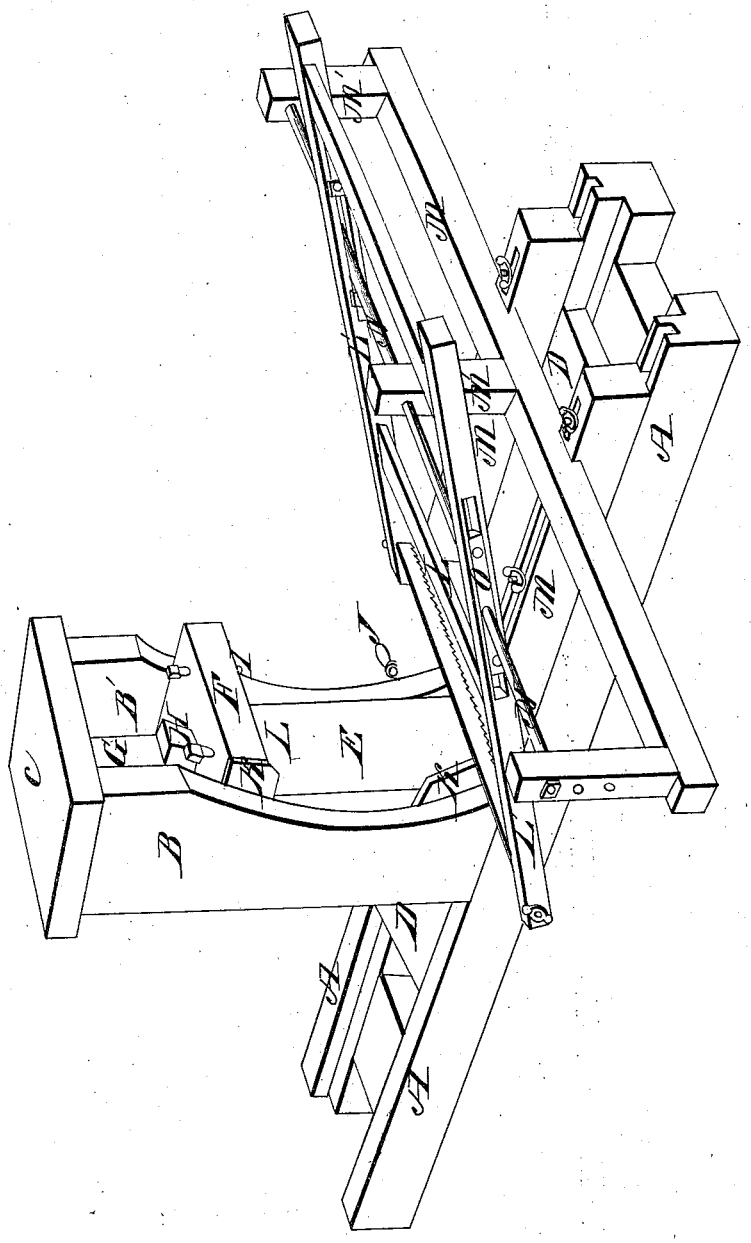

UNITED STATES PATENT OFFICE.

THOS. KENDERDINE, JR., OF HORSAM TOWNSHIP, MONTGOMERY COUNTY, PENNSYLVANIA.

MACHINE FOR SAWING STUFF CIRCULAR.

Specification of Letters Patent No. 1,719, dated August 12, 1840.

*To all whom it may concern:*

Be it known that I, THOMAS KENDERDINE, Jr., of Horsam township, in the county of Montgomery and State of Pennsylvania, have invented an Improvement in Machines for Sawing Stuff of Various Kinds into Circles or Segments of Circles of different Degrees of Curvature; and I do hereby declare that the following is a full and exact description thereof.

I construct a frame saw of such width as shall adapt it to the length of the saw which it is to carry; this frame may consist of two side pieces, into which two cross pieces may be framed, the saw being strained at one end of the side pieces, by means of screws, or otherwise. The saw frame, when in use, is made to traverse back and forth upon a guide rod, consisting of a straight and smooth, round bar of metal, which is made to pass through holes in the side pieces of the frame, or through holes in sliding pieces thereon, which sliding pieces are capable of being so adjusted as that the distance of the saw from the guide rod shall be equal to the radius of the circle to which the stuff is to be cut. The stuff to be sawed, is to be held in front of the saw by means of a clamp of any suitable construction, furnished with set screws, or other means of fastening the stuff. This clamp is to be placed on a sliding carriage, allowing it to be made to approach, or to recede from the saw. The saw frame, also, is placed upon a sliding carriage, admitting of the adjustment of its distance from the stuff. A saw of this description may be moved by hand, in the manner of the ordinary frame, or turning saw; or it may be worked by the application of any suitable power. In all cases, the guide rod will serve to direct the saw in the proper curve, and will cause it to cut perfectly square and true.

The accompanying drawing is a representation of my machine in perspective.

A, A, is the basis of the machine, which constitutes a railway upon the sides, or string pieces, of which, the frame that supports the saw and its frame is made to slide, as is also the clamp by means of which the stuff to be sawed is to be held.

B, B, are two cheeks framed into the string pieces A, A, and united at top by the cap-piece C.

D, D, is the bottom piece of the sliding carriage, or clamp, that holds the stuff to be sawed.

E, is a piece of timber framed into this bottom piece, and rising vertically to such height as may be necessary to adapt it to the length of the plank, or other stuff, that is to be received between the bottom piece D, D, and the adjustable top piece F, between which and the bed of the carriage the stuff is to be confined. The top piece F, is of such width as just to slide freely between the cheeks B, B, which serve to steady it; and the top piece F, has a mortise in it through which passes the piece G, that forms a part of the piece E; the wedge H, serving to confine the piece F, at any required height.

I, I, are set screws passing through F, and serving to confine the stuff to be sawed. Screws passing through the cheek B′, as at J, may also be made to bear against one side of the stuff, and press it against bearing pieces K, K, attached to E, and F. It will be manifest that other devices of an analogous character may be adapted for holding the stuff. The sliding clamp is to be held in place by screw bolts, or other well known devices.

L, L, is the saw frame, resting upon its sliding carriage M, M. The saw frame has a round guide rod N, N, passing through holes in its side pieces L′ L′; or, rather, through adjustable slide pieces O, attached to said side pieces, by means of which the saw may be adjusted to the required radius. The guide rod is supported by the vertical pieces M′, which may be furnished with holes at different heights, or may be constructed with adjustable slides, if preferred. The cheek pieces M, M, of the saw carriage are furnished with screw nuts passing through slots, or mortises, in the saw carriage, by which to attach the carriage to the pieces A, A, in any required situation.

I have above stated that the saw frame thus connected and arranged, may be worked by hand; a shackle bar actuated by a pitman, may be connected with one of its side pieces, or a reciprocating motion may be communicated to it in any of the known ways of effecting this object.

Although I have described the manner in which the respective parts of my machine may be constructed, I do not intend thereby to limit myself in this particular, as I do not rest my claim to invention on the mode of confining the stuff to be sawed, or on the form of the apparatus as represented; but What I do claim, and desire to secure to myself by Letters Patent, is—

The use of the guide rod N, N, passing through the sides of the saw frame, which is to be made adjustable so as to adapt it to different curves, substantially in the manner herein set forth.

In testimony whereof I hereunto set my hand the twenty-second day of June, in the year 1840.

THOMAS KENDERDINE, JR.

Witnesses:
 THOS. P. JONES,
 GEO WEST,